April 14, 1970 C. D. WALDRON Re. 26,853
ROOM AIR PURIFIER
Original Filed June 3, 1966
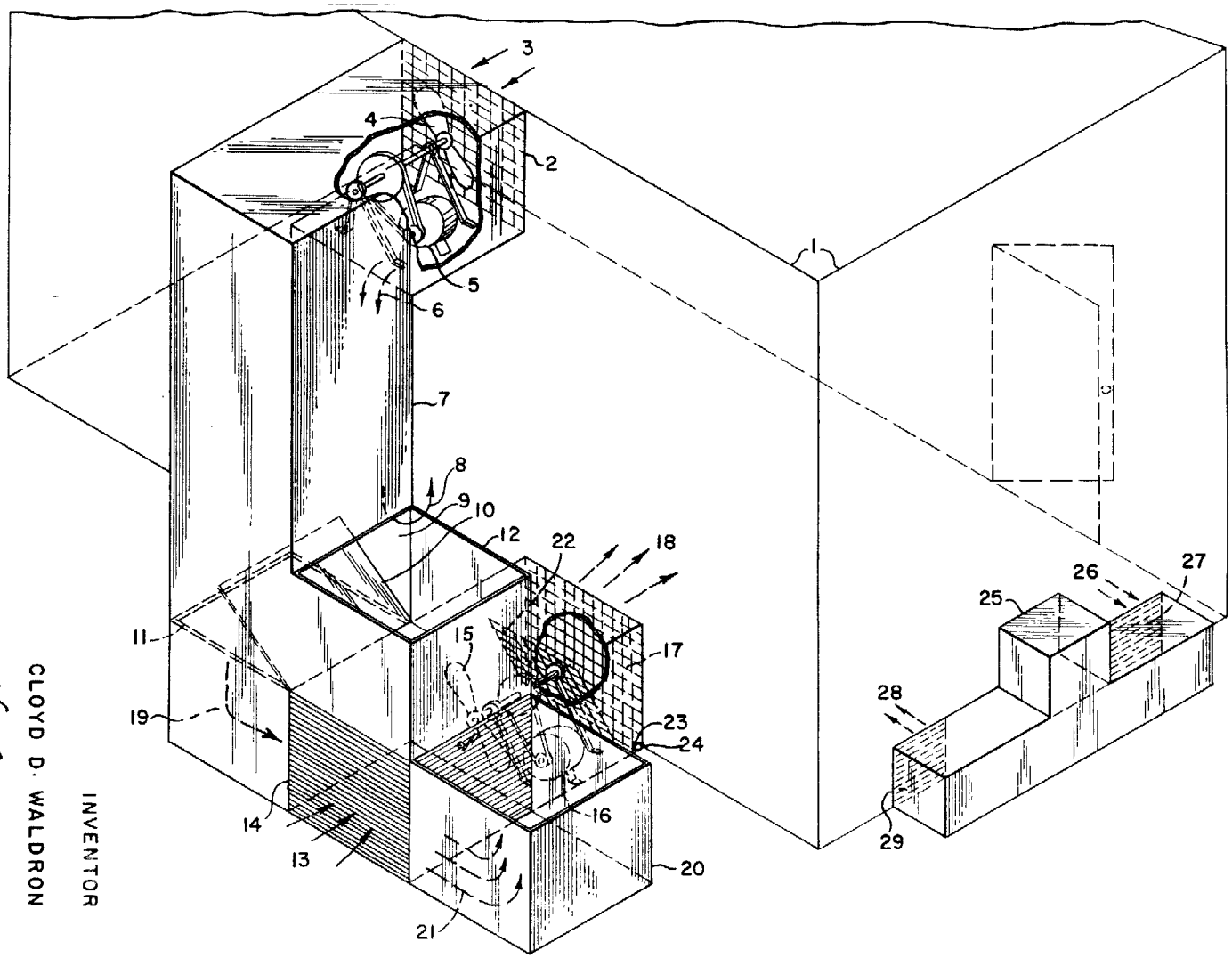
INVENTOR
CLOYD D. WALDRON
Hitchcock & Milans
ATTORNEYS United States Patent Office Re. 26,853
Reissued Apr. 14, 1970

26,853

ROOM AIR PURIFIER

Cloyd D. Waldron, 1308 Willow Lane,
Mobile, Ala. 36605

Original No. 3,417,577, dated Dec. 24, 1968, Ser. No. 555,141, June 3, 1966. Application for reissue Mar. 20, 1969, Ser. No. 817,230
Int. Cl. F25d *23/12*
U.S. Cl. 62—263 5 Claims

Matter enclosed in heavy brackets [ ] appears in the original patent but forms no part of this reissue specification; matter printed in italics indicates the additions made by reissue.

ABSTRACT OF THE DISCLOSURE

Room ventilating apparatus that positively replaces foul air in the room with fresh air by using a fan to remove foul air from near the ceiling of the room, and by using another fan to add fresh air near the floor of the room. The positive exchange of heat between removed air and inducted air by positively forcing both through a heat exchanger. The use of a flat plate heat exchanger that can have more heat flow area than exchangers formerly proposed.

The present invention relates to a method and apparatus for purifying air in a room.

At present rooms in which large numbers of people stay for considerable lengths of time, such as bars, theaters, dance halls, etc., often smoking, become so laden with smoke and odors, and deficient in oxygen as to be come uncomfortable and unhealthy. Usually almost nothing is done about eliminating smoke or introducing fresh air. Simply venting refrigerated or heated air from the room and replacing it with heated or cooled fresh air is expensive and requires larger refrigerating and heating equipment. Room ventilation systems usually are designed so that even if an attempt were made to introduce fresh air and to draw out foul air a large amount of the fresh air introduced would be withdrawn along with the foul air.

The present invention is a method and apparatus for accomplishing both these needed actions of introducing fresh air inexpensively, and withdrawing foul air efficiently. The apparatus draws smoke and warm air from near the ceiling of a room, and introduces fresh air near the floor of a room. This gives efficient removal of foul air.

The apparatus uses power to withdraw smoky air, and uses power to introduce fresh air, so that there is a positive exchange of air no matter what the pressure in the room.

The method draws air from near the floor of a room, heats or refrigerates it, then reintroduces the air near the floor of the room so that smoky or foul air is allowed to accumulate undisturbed near the ceiling for efficient scavenging of foul air.

The apparatus can pass both educted foul air and fresh air through a heat exchanger so that some of the refrigeration or heat in the evacuated air is transferred into the fresh air that is to be introduced, giving economy.

The apparatus allows the discharge of foul air to the atmosphere without passing it thru the heat exchanger when the air near the ceiling is warm, when cool introduced air is desired, and when the atmospheric night air already is cool.

The invention makes provision for removing entrained moisture from fresh air that has been passed thru the heat exchanger and chilled.

These and other objects and advantages of the invention will become apparent from the following description and accompanying drawing.

The figure is a 3-dimensional view of a room with the invention.

In the figure lines 1 are the corners bounding a living space or room. 2 is a grill in the upper part of one of the room walls, thru which stale or smoky air 3 is withdrawn from the upper part of the room. The stale air is withdrawn by fan 4, that is driven by motor 5, caused to follow arrow 6 thru duct 7 downward. The stale air can follow arrow 8 into the atmosphere thru opening 9 in duct 7 when swinging door or damper 10 is in its downward position against its stops 11. Open topped duct 12 can deflect the stale air discharged through opening 9 upward, as indicated by arrows 8, so as to prevent its mixing with the fresh air to be introduced lower in the apparatus.

Instead of withdrawing stale air thru one grill opening 2 in the upper part of the room, the stale air could be withdrawn thru multiple openings in the ceiling of the room or thru multiple grill openings in the upper part of the room walls.

At the same time that stale air is withdrawn from the room and discharged to the atmosphere as described, fresh air 13 is being drawn from the atmosphere and passed thru heat exchanger 14 by fan 15 that is driven by motor 16. This fresh air is discharged from grill 17 as air flow lines 18 into the lower part of the room.

The above described path of stale air and fresh air exists when the educted stale air is to be wasted atmosphere and no exchanging of heat between stale air and fresh air is to take place. The heat exchanger merely acts as a conductor of fresh air.

When heat is to be transferred between stale air and fresh air, damper or door 10 is turned into its upper position to close opening 9. The withdrawn stale air 6 is caused to continue on down duct 7 along path 19 and to pass horizontally thru the heat exchanger 14, to be turned upward by duct 20 and be discharged upward to the atmosphere along lines 21.

The heat exchanger 14 is constructed so that the openings thru which fresh air is passed thru the heat exchanger along lines 13 are pneumatically separate from the alternate openings thru which foul air 19 and 21 passes thru the exchanger. Heat transfer takes place thru the sheets of the heat exchanger that separate fresh air 13 from foul air 19.

Different methods could be used to remove entrained condensed moisture from the fresh air after it has become chilled in passing thru the heat exchanger. One method is shown in the drawing.

A screen 22 across the fresh air duct between the heat exchanger and room grill will collect a large amount of the condensed vapor. The liquid clinging to the screen will run down it and pass into the gutter 23 along the bottom of the screen. The moisture collected in the gutter will pass thru the duct opening 24 into the atmosphere.

To obtain more heat exchange area another heat exchanger could be put on the other side of duct 7 so that stale air flowing downward thru duct 7 could split at the bottom of the duct and one-half of the air go thru each exchanger. There would then be two fans and grills to introduce fresh air into the room.

If desired fresh air could be introduced thru many openings in the lower part of the room instead of thru the one grill shown or the two grills described.

In order to permit smoky, warm, stale air to collect undisturbed in the upper part of the room the air conditioner or heater 25 and its ducts can be located so as to draw air 26 from the lower part of the room thru grill 27, pass it thru the heater or cooler 25, and reintroduce it into the lower part of the room along lines 28 thru grill 29. Instead of two grills 27 and 29 the air could be withdrawn or reintroduced thru many smaller grills.

Although one embodiment of the method and apparatus are shown, many combinations and variations of the apparatus can be used within the scope of the invention.

I claim:

1. An air changing unit for heated or cooled enclosures comprising an exhaust [duct] *opening* positioned near the ceiling of the enclosure and having power driven air moving means *and any required duct means* associated therewith for positively withdrawing stale air from the upper portion of said enclosure, a fresh air inlet [duct] *opening* positioned near the floor of said enclosure and having power driven air moving means *and any required duct means* associated therewith for positively introducing fresh air into the lower portion of said enclosure, a plate type heat exchanger *with appropriate ducts* [positioned adjacent to] *connected to* said inlet [duct] *opening, to said exhaust opening, to said fresh air moving means and to said stale air moving means,* and providing two sets of passageways angularly disposed in cross flow and heat exchange relationship to each other, one set of passageways being [open] *connected* at one end to the exterior atmosphere and connected at the other end to the fresh air inlet [duct] *opening* to lead fresh air *with the help of said fresh air moving means and said any required duct means* from the exterior to said fresh air inlet [duct] *opening* for direct and positive entry into the enclosure, [duct means extending downwardly from said exhaust duct and connected to] one end of the other set of passageways of said heat exchanger *being connected to said exhaust opening, the other end of said other set of passageways being connected to the atmosphere,* so that *with the help of said stale air moving means and said any required duct means* positively withdrawn stale air is passed in heat exchange relationship through said heat exchanger with said incoming fresh outside air before said stale air is discharged to the atmosphere [on] *after* leaving the other end of said other set of passageways.

2. An air changing unit for heated or cooled enclosures as defined in claim 1, wherein said [downwardly extending duct is] *appropriate ducts that connect said exhaust opening and said heat exchanger are* provided with by-pass means for passing the outgoing stale air [directly] to atmosphere without passing through said heat exchanger.

3. An air changing unit for heated or cooled enclosures as defined in claim 2, wherein said by-pass means comprises an opening in said [downwardly extending duct means above the connection with the] *appropriate ducts that are connected between said exhaust opening and said* heat exchanger and an associated damper plate.

4. An air changing unit for heated or cooled enclosures as defined in claim 1, wherein [said fresh air inlet duct contains] *duct means is used between said fresh air inlet opening and said other end of said one set of passageways, said duct means containing* means for removal of entrained condensed moisture from the incoming air.

5. An air changing unit for heated or cooled enclosures as defined in claim 1, wherein [a plurality of] exhaust [ducts] *duct means* and fresh air inlet [ducts] *duct means* are employed [and positioned as defined] with reference to said enclosure, with [each fresh air inlet] *said fresh air duct means* receiving fresh air through a plate type heat exchanger as defined, and [each] *said* exhaust duct *means* [leading to a downwardly extending duct] connected to [a] *the* heat exchanger as defined.

References Cited

The following references, cited by the Examiner, are of record in the patented file of this patent or the original patent.

UNITED STATES PATENTS

| | | | |
|---|---|---|---|
| 1,548,159 | 8/1925 | Murray | 165—166 |
| 2,019,351 | 10/1935 | Lothrop | 62—262 |
| 2,033,402 | 3/1936 | Smith | 165—166 |
| 2,120,208 | 6/1938 | Paschal | 62—262 |
| 2,147,475 | 2/1939 | Wilbur | 62—314 |
| 2,224,878 | 12/1940 | Morrison | 62—262 |
| 2,309,224 | 1/1943 | Terry | 62—186 |
| 2,367,223 | 1/1945 | Larrecq | 165—66 X |
| 2,401,560 | 6/1946 | Graham | 62—262 |
| 2,497,947 | 2/1950 | Lewis | 62—314 |
| 2,708,833 | 5/1955 | Nigro | 62—262 |
| 3,265,129 | 8/1966 | Bawabe | 165—166 |

WILLIAM J. WYE, Primary Examiner

U.S. Cl. X.R.

62—263, 314, 408, 419; 165—166